United States Patent [19]

Sharaby et al.

[11] Patent Number: 5,227,390
[45] Date of Patent: Jul. 13, 1993

[54] POLYVINYL HALIDE IONOMERS

[75] Inventors: Zaev Sharaby, Cleveland Heights; Murali Rajagopalan, Avon Lake, both of Ohio

[73] Assignee: The B. F. Goodrich Company, Brecksville, Ohio

[21] Appl. No.: 553,012

[22] Filed: Jul. 16, 1990

[51] Int. Cl.$^5$ .................................................. C08F 8/42
[52] U.S. Cl. .......................... 525/331.5; 525/328.8; 525/329.5; 525/330.2; 525/353; 525/366; 525/367; 525/368; 525/369; 526/318
[58] Field of Search .............. 525/328.8, 329.5, 330.2, 525/331.5; 526/318

[56] References Cited

U.S. PATENT DOCUMENTS

| | | | |
|---|---|---|---|
| 2,605,254 | 7/1952 | Wolf | 526/318 |
| 2,731,449 | 1/1956 | Rowland, Jr. | 526/318 |
| 3,166,534 | 1/1965 | Perrins | 526/318 |
| 3,950,312 | 4/1976 | Kurz | 526/318 |
| 4,113,792 | 9/1978 | Pastor et al. | 525/155 |

FOREIGN PATENT DOCUMENTS 2-196846 8/1990 Japan.

*Primary Examiner*—Bernard Lipman
*Attorney, Agent, or Firm*—Miles B. Dearth

[57] ABSTRACT

A polyvinyl halide ionomer which contains in the polymer backbone at least one vinyl halide monomer in polymerized form or at least one vinyl halide monomer and at least one other monomer copolymerizable with vinyl chloride and less than 50% by weight of the ionomer a comonomer containing at least one ester group and at least one neutralized carboxyl group. The ionomer is prepared by neutralizing, preferably in a molten state, a functionalized vinyl halide copolymer containing pendant carboxyl groups. The ionomer has outstanding adhesion to metals and its glass transition temperature is higher than the carboxyl vinyl halide copolymer.

13 Claims, No Drawings

POLYVINYL HALIDE IONOMERS

BACKGROUND OF THE INVENTION

Polyvinyl halide ionomers are synthetic organic polymers that have a low ion content and are, thus, generally insoluble in water and soluble in organic solvents. Specifically, an ionomer can be defined as an ionized copolymer whose major component is a nonionic backbone, usually hydrocarbon, and at least one minor component consisting of ionic comonomers with associated counterions. The ionic groups may either have been copolymerized with the major component or have been introduced by modifying a nonionic polymer through appropriate chemical techniques. The acid component, frequently in the form of pendant carboxylic or sulfonic acid groups, is then partially or completely neutralized to form the ionomer.

There is great interest in ionomers which lies in the often profound changes in properties caused by the introduction of ions into nonionic polymers, many of these changes having important industrial potential. These changes manifest themselves in polymer glass transition temperatures, dynamic mechanical properties, and melt rheology.

SUMMARY OF THE INVENTION

Polyvinyl chloride ionomers are prepared by neutralizing polyvinyl chloride polymers containing pendant carboxyl groups with a neutralizing agent, preferably in a molten state.

DETAILED DESCRIPTION OF THE INVENTION

The invention herein is directed to polyvinyl halide ionomers which have higher glass transition temperature than the corresponding stabilized carboxyl-containing polyvinyl halide polymers. The ionomers described herein are prepared by neutralizing carboxyl groups in a polyvinyl halide polymer containing pendant carboxyl groups. This is done preferably in a molten state at a temperature of 160° C. to 210° C. The carboxyl groups on the polyvinyl halide polymer can be provided by copolymerizing a carboxyl comonomer with a vinyl halide monomer or by reacting in a molten state a hydroxyl-containing vinyl halide polymer with an anhydride, preferably a dianhydride. The hydroxyl-containing vinyl halide polymer can be prepared by reacting a vinyl halide monomer with a hydroxy acrylate such as 2-hydroxyethyl acrylate and methacrylate, and hydroxypropyl acrylate and methacrylate.

U.S. patent application Ser. No. 553,011, filed Jul. 16, 1990, now abandoned describes preparation of high carboxyl vinyl halide polymers by suspension polymerizing a vinyl halide monomer with at least one carboxyl comonomer whereby the resulting polymer contains 3–40% by weight, preferably 5–30%, of at least one carboxyl comonomer.

Although up to 97% by weight of the carboxyl vinyl halide polymer can be derived from one or more vinyl halide polymers, it should be understood that this portion of the polymer can include one or more of other monomers such as vinyl acetate, 1-olefins such as ethylene and propylene, acrylic acid, acrylonitrile, and other monomers with which vinyl halide monomer, particularly vinyl chloride, copolymerizes. The minimum 3% by weight of the polymer is derived from at least one carboxyl comonomer. The proportion of the polymer derived from at least one carboxyl comonomer can be as high as 40%, preferably 5–30% by weight of the vinyl halide polymer.

The vinyl halide polymer of this invention contains more than 50% by weight, preferably more than 60% by weight and up to 97% by weight of polymerized vinyl halide monomer or a mixture of such monomers. Suitable vinyl halide monomers include vinyl chloride, vinyl fluoride, vinyl bromide, vinyl iodide and the corresponding vinylidene halides. Preferred vinyl halide monomer is vinyl chloride.

A suitable comonomer will yield a vinyl halide, especially vinyl chloride, polymer with high content of carboxyl groups. Suitable comonomer is selected from monomers which are copolymerizable with vinyl halide monomers, vinylidene halide monomers, especially vinyl chloride and vinylidene chloride monomers. A suitable comonomer is also insoluble in water to the extent of less than 5% by weight. A suitable comonomer is also selected from monounsaturated monomers containing at least one carboxyl group and at least one ester group but devoid of anhydride groups. Especially suitable comonomers are reactive, relatively insoluble monounsaturated monoesters which contain one carboxyl group and one ester group but devoid of any other functional group, particularly monoalkylacrylates of a monounsaturated dicarboxylic acid containing less than 5 carbon atoms in the alkyl group and monoalkylacrylates of an aromatic saturated dicarboxylic acid such as phthalic acid.

The high carboxyl vinyl halide polymers used in this invention are preferably prepared by suspension polymerizing a carboxyl-containing monomer defined herein with a vinyl halide monomer in the presence of conventional components present in a suspension polymerization system. Suspension process referred to herein utilizes a chain transfer agent to produce the vinyl halide polymers having a high content of carboxyl groups at a temperature below 100° C., preferably 40°–80° C. Suitable chain transfer agents include, for example, carbon tetrachloride, trichloroethylene, perchloroethylene, propionaldehyde, n-butylaldehyde, and certain mercapto-containing organic compounds. The most preferred chain transfer agent is a composition of at least one mercaptan chain transfer agent, i.e., 2-mercaptoethanol, and optionally, at least one non-polymerizable material which is mixable with the mercaptan chain transfer agent.

The most preferred mercaptan for use in the present invention is 2-mercaptoethanol (2-ME), however, any chain transfer agent having one or more mercapto (—SH) group(s) is acceptable.

The chain transfer composition may be premixed with the comonomer to encapsulate the mercaptan chain transfer agent before its introduction into the reactor. Alternatively, the chain transfer agent may be pre-mixed with a non-polymerizable material which is miscible with the chain transfer agent and is substantially insoluble in water. The non-polymerizable material may be a monomer, oligomer or a polymer. Suitable non-polymerizable material is dioctyl phthalate. Usually, the chain transfer composition must contain at least an equal amount by weight of non-polymerizable material as chain transfer agent in order to encapsulate or host the chain transfer agent. Preferably, the composition contains at least twice as much of non-polymerizable material as chain transfer agent.

The amount of chain transfer agent employed in the practice of this invention is in the range from 0.05 to 2.0 phm by weight per 100 phm of vinyl halide monomer and said carboxyl comonomer. Preferably, from 0.1 to 1.0 phm by weight per 100 phm of said monomers and most preferably 0.1 to 0.8 may be employed. The chain transfer agent may be added to the reaction medium before the onset of polymerization or it may be metered in during the course of the polymerization reaction in combination with the comonomer.

The preferred polymerization initiators utilized in the process for preparing the polymers of the present invention are alpha-cumyl peroxyneodecanoate, t-butyl peroxyneodecanoate, t-butyl peroxypivalate and t-amyl peroxyneodecanoate or combinations thereof. Most preferably, a dual initiator composition comprising alpha-cumyl peroxyneodecanoate and t-butyl peroxypivalate is utilized as the initiator. This initiator system results in a reduced residual initiator level in the final product and a shorter high temperature history due to faster reactions.

The carboxyl vinyl halide polymer can also be produced in a molten state by reactive processing. This is done by first preparing a hydroxyl containing vinyl polymer and then reacting the polymer with an anhydride. The hydroxyl containing polymer can be prepared in a known way by reacting a vinyl halide monomer and a hydroxy acrylate, such as 2-hydroxyethyl acrylate. The carboxyl vinyl halide polymer is prepared by reacting the hydroxyl containing polymer with an anhydride (or dianhydride) whereby hydroxy groups are converted to carboxyl groups, as demonstrated below:

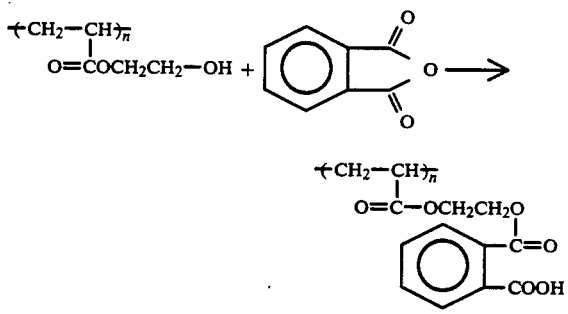

The carboxyl vinyl halide polymers are neutralized with a suitable neutralizing agent. This can be done in a molten state by melting the polymer or resin with the neutralizing agent to effect neutralization of all or part of the carboxyl groups on the polymer. Neutralization can also be accomplished in a liquid state by dissolving or dispersing the polymer in a solvent or diluent and neutralizing all or part of the acid groups on the polymer. It is preferable to neutralize all of the carboxyl groups on the polymer to effect complete and not partial neutralization.

In reactive processing where the polymer, additives, anhydride, and a neutralizing agent are added together on a mill where processing is done in a molten state, the carboxyl or functionalized polymer is preferably formed first before neutralizing agent is introduced. This procedural sequence is followed if it is desired to obtain an ionomer polymer which has improved or higher glass transition temperature than its corresponding stabilized carboxyl copolymer.

Suitable neutralizing agents can be used to neutralize at least one-half of the carboxyl groups on the carboxyl vinyl halide copolymer. Suitable neutralizing agents include metal oxides and hydroxides such as alkali metal and alkaline earth metal oxides and hydroxides. Specific examples of suitable neutralizing agents include sodium hydroxide, potassium hydroxide, magnesium oxide, calcium carbonate, calcium oxide, tribasic lead sulfate, and dibasic lead stearate. Zinc oxide alone should be avoided since it deteriorates or burns the copolymer.

Resulting ionomers are salts of vinyl halide copolymers. Such ionomers have improved or higher glass transition temperatures and better metal adhesion than the corresponding functionalized or carboxyl vinyl halide copolymers. The glass transition temperature improvement is more than 3° C., and preferably greater than 4° C. per one weight percent of the neutralizing agent incorporated into the neutralized vinyl halide copolymer.

The improvement or higher glass transition temperature is not realized when a homopolymer of vinyl chloride is processed with magnesium oxide. For instance, vinyl chloride homopolymer with inherent viscosity of 0.53 had Tg of 80.7° C. which was reduced to 73.8° C. on addition of 2 phr of dimethyl tin stabilizer. On addition of 1.53 phr magnesium oxide, the Tg increased to only 75.6° C. When 3.06 phr was used, Tg was 74.4° C. The quantity "phr" represents parts per hundred parts of resin on weight basis.

The copolymer resins or ionomers obtained from the process of the present invention may contain impact modifiers, pigments, fillers, stabilizers and plasticizers and the like which are conventionally present in polyvinyl halide, particularly polyvinyl chloride, molding compositions in conventional quantities. In preparing such molding compositions, the ingredients are mixed by conventional procedures used in the production of molded products. For example, the desired resin composition containing the copolymer resins of the present invention is kneaded by a mill roll, a Banbury mixer, an extruder or the like, and thereafter is fed in the molded step of calendering, extrusion, injection or pressing. In calendering, the composition is continuously fed to a calender and calendered into a film or sheet. In the case of extrusion molding, injection molding or press molding, the kneaded composition may be molded after it is pelletized. The molding conditions herein are the same as the conventional processing conditions for polyvinyl chloride and any specific conditions are not required.

The following examples will teach one skilled in the art how to practice the invention disclosed herein but the examples are not intended to serve as a limitation on the scope of the present invention which scope is defined by the claims appended hereto.

EXAMPLE 1

This example demonstrates preparation of a carboxyl vinyl chloride copolymer which can be subsequently neutralized to produce polyvinyl chloride (PVC) ionomer described herein.

The recipe used in preparing the carboxyl vinyl chloride copolymer on weight basis of the vinyl chloride monomer was as follows:

| | |
|---|---|
| Vinyl Chloride Monomer (VCM) | 100.0 |
| Mono-2-Acryloxyethyl Phthalate Comonomer[1] | 10.0 |
| Demineralized Water | 150.0 |

| | |
|---|---|
| Suspending Agent | 0.10 |
| Porosifier | 0.08 |
| α-Cumyl Peroxyneodecanoate Initiator | 0.055 |
| t-Butyl Peroxypivalate Initiator | 0.100 |
| 2-Mercaptoethanol Chain Transfer Agent | 0.20 |
| Non-Polymerizable Material | 0.40 |

[1] The structure is

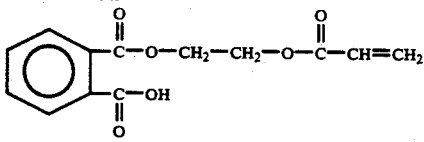

Suspension polymerization was conducted in a conventional 3-liter stainless steel reactor at 70° C. with vinyl chloride monomer and water added to the reactor in that respective order. The copolymer resins were then recovered, stripped, washed, dried and characterized for inherent viscosity, average particle size, particle size distribution, and Mercury intrusion porosity. Inherent viscosity was measured by ASTM D-1243 procedure, average particle size and particle size distribution were determined by standard screen analysis, and Mercury intrusion porosity was determined by ASTM D-2873 procedure. Conversion was determined by the final weight of the dry product.

In carrying out suspension polymerization, 150 weight parts of water, and 100 weight parts of inhibited vinyl chloride monomer in liquid form was added to the 3-liter reactor equipped with an agitator along with dispersant, porosifier and initiators. Heating of the reactor commenced through the jacket around the reactor. Mercaptoethanol chain transfer agent was mixed with non-polymerizable material (Span 80) and charged to the reactor when the reactor temperature reached 40° C. The comonomer was metered into the reactor over 90 minutes when temperature of the reactor reached 70° C.

Reaction time was 360 minutes, inherent viscosity of the carboxyl vinyl chloride polymer was 0.497, average particle size was 148 microns, particle size distribution was 65, Mercury porosity was 0.143 ml/g, and bound comonomer was 11.6% in the copolymer.

EXAMPLE 2

This example demonstrates preparation of a vinyl chloride ionomer.

The resin used in this example was polyvinyl chloride copolymer containing 15 weight percent monoacryloxyethylphthalate comonomer which resin has inherent viscosity of 0.597.

Amount of the resin was 60 grams which was used in a Brabender plasti-corder (fusion mixer) at 165° C. with 1.2 g dimethyl tin stabilizer and 0.92 g of pre-dried magnesium oxide. Total time on the Brabender was 10 minutes.

The resulting polyvinyl chloride ionomer had glass transition temperature of 64.7° C. The Tg measurements were carried out on the Mettler DSC-30 instrument at 10° C. per minute heating rate. Additional tests were conducted to determine effect of the stabilizer and neutralizer on glass transition temperature (Tg) with the following results:

| | |
|---|---|
| Copolymer Resin alone | 63.8° C. Tg |
| Resin + Stabilizer | 53.9° C. Tg |
| Resin + Stabilizer + MgO | 64.7° C. Tg |

On the basis of the above results, it is apparent that glass transition temperature increases due to the ionomeric effect on the copolymer. Neutralization of the carboxyl vinyl chloride polymer resin increased glass transition temperature to about the level of the resin alone and compensated for the drop in the glass transition temperature caused by the stabilizer.

EXAMPLE 3

This example demonstrates preparation of carboxyl vinyl chloride copolymer by reactive processing technique in a molten state and neutralization of the carboxyl vinyl chloride copolymer to form the PVC ionomer of this invention.

The resin employed was a vinyl chloride copolymer having inherent viscosity of 0.95.

A total of 46.5 grams of this resin was masticated for 1.5 minutes on a Brabender at 180° C. with 0.93 g of dimethyl tin stabilizer and 7.44 g of Epiclon ® B-4400 dianhydride. The dianhydride 5-(2,5-dioxotetrahydro-3-furanyl)-3-cyclohexene-1,2-dicarboxylic anhydride has the following structure:

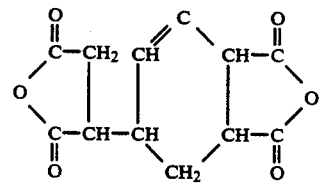

Then, the resulting carboxyl vinyl chloride polymer (Tg of 75.9° C.) was neutralized with 5.12 g of magnesium oxide on the Brabender for 3 minutes to neutralize the carboxyl groups to form PVC ionomer. Glass transition temperature of the ionomer was 88.7° C.

We claim:

1. A polyvinyl chloride ionomeric composition, comprising: the reaction product of a hydroxyl containing polyvinyl chloride polymer and at least one of an anhydride and a dianhydride; and a carboxyl neutralizing agent, present in an amount sufficient to neutralize at least one-half of said carboxyl groups.

2. A polyvinyl chloride ionomeric composition, comprising: a carboxyl vinyl chloride copolymer and a carboxyl neutralizing agent for said carboxyl groups, present in an amount sufficient to neutralize at least one-half of said carboxyl groups.

3. A polyvinyl chloride ionomeric composition of claim 2, wherein said copolymer comprises 100 weight parts vinyl chloride copolymerized with from about 3 to about 40 weight parts of at least one carboxyl comonomer soluble in water at less than 5% by weight and wherein said carboxyl neutralizing agent is selected from the group consisting of alkali metal oxides, alkali metal hydroxides, alkaline earth oxides, alkaline earth hydroxides, alkaline carbonates, tribasic lead sulfate, and dibasic lead stearate.

4. A polyvinyl chloride ionomeric composition of claim 3 wherein said carboxyl comonomer is selected from the group consisting of a monoalkylacrylate of a mono unsaturated dicarboxylic acid, and a monoalkylacrylate of an aromatic dicarboxylic acid.

5. A polyvinyl chloride ionomeric composition of claim 3 wherein said carboxyl neutralizing agent is present in an amount sufficient to neutralize all of said carboxyl groups.

6. A polyvinyl chloride ionomeric composition of claim 2 wherein said carboxyl neutralizing agent is present in an amount sufficient to neutralize all of said carboxyl groups.

7. A polyvinyl chloride ionomeric composition of claim 2 wherein said polyvinyl chloride copolymer is polymerized in suspension in the presence of a chain transfer agent.

8. A polyvinyl chloride ionomeric composition of claim 1 wherein said polyvinyl chloride copolymer is polymerized in suspension in the presence of a chain transfer agent.

9. A polyvinyl chloride ionomeric composition of claim 1 wherein said polyvinyl chloride polymer comprises 100 weight parts of vinyl chloride polymerized with from about 3 to about 40 weight parts of a hydroxy acrylate comonomer; said copolymer is combined in the molten state with a carboxyl neutralizing agent selected from the group consisting of an alkali metal oxide, an alkali metal hydroxide, an alkaline metal oxide, an alkaline metal hydroxide an alkaline carbonate, tribasic lead sulfate, and dibasic lead stearate; and at least one of an anhydride and a dianhydride.

10. The composition of claim 3 wherein said comonomer is selected from the group consisting of monoalkylester of a dicarboxylic acid having 1 to 5 carbons in the alkyl ester and a monoalkyl acrylate of phthalic acid.

11. The composition of claim 9 wherein said hydroxylalkyl acrylate is 2-hydroxyethyl acrylate and said anhydride is phthalic anhydride.

12. The composition of claim 9 wherein said dianhydride is 5-(2,5-dioxotetrahydro-3-furanyl)-3-cyclohexene-1,2-dicarboxylic anhydride.

13. The composition of claim 3 wherein said monoalkyl acrylate of an aromatic dicarboxylic acid is momo-2-acryloxyethyl phthalate.

* * * * *